Figure 1:
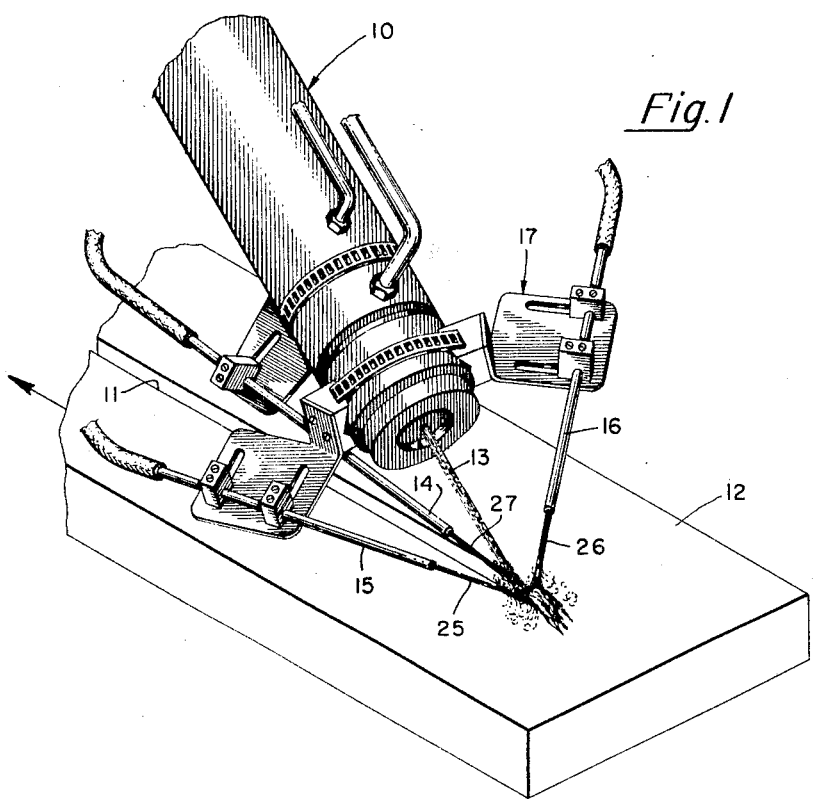

June 6, 1967   J. M. HERRING, JR   3,324,277

PLASMA TORCH AND AUXILIARY JET ARRANGEMENT

Filed June 17, 1963

INVENTOR.
JAMES M. HERRING, JR.

BY

*Douglas R. McKechnie*
ATTORNEY

United States Patent Office 3,324,277
Patented June 6, 1967

3,324,277
PLASMA TORCH AND AUXILIARY JET
ARRANGEMENT
James M. Herring, Jr., Rosemont, Pa., assignor to The
Budd Company, Philadelphia, Pa., a corporation of
Pennsylvania
Filed June 17, 1963, Ser. No. 288,373
5 Claims. (Cl. 219—69)

This invention relates to a plasma torch and an auxiliary jet arrangement for cutting and machining metal workpieces.

Plasma torches are well known and produce a high temperature plasma jet by passing an ionizable gas between a pair of electrodes across which an arc is struck. Among its many uses, a plasma torch can be employed to machine a workpiece to produce, for example, a groove. But, in such applications, problems are encountered in the control over the depth of the groove and in the removal of molten metal from the groove.

In the prior art, the control over the groove depth has been achieved by varying the electric power applied to the plasma torch, the rate of gas flow through the plasma torch, and the relative speed between the torch and workpiece. Where the desired groove is of variable depth, the control of the plasma torch is difficult to achieve. The problem is particularly acute when it is desired to increase the depth of the groove because both the electrical power and the gas flow rate have to be increased in a rather delicate balance since their effects are opposite, i.e., one raises and one lowers the temperature of the plasma jet. When the power is increased, the temperature of the plasma jet increases and thereby produces more molten metal. In order to blow the increased amount of molten metal from the groove, the gas flow has to be increased. But, an increase in the gas flow lowers the plasma jet temperature.

When it is desired to decrease the depth of the groove, the problem is not so acute because this can be done by merely lowering the electrical power with a resultant decrease in temperature and in the amount of molten metal. Since the gas flow is effective to remove the molten metal at the previous higher temperature, then it is also effective to remove the molten metal at the lower temperature.

In cutting a groove, the plasma jet is caused to move forwardly and downwardly relative to the workpiece whereby molten metal is blown out of and ahead of the groove being cut. However, some of the molten metal flows transversely of the groove and builds up along its sides to form ridges, which, in many cases, are undesirable and have to be removed by further operations.

Accordingly, one of the objects of the invention is to provide a novel jet arrangement for a plasma torch, which overcomes the above problems.

Another object is to provide a jet arrangement which controls the depth of a groove being cut without having to vary the electrical power, the gas flow rate, or the travel speed of the plasma torch.

Still another object is to provide a plasma torch and jet arrangement which will cut a groove without building up ridges of metal along the groove and on top of the workpiece.

Figure 2:
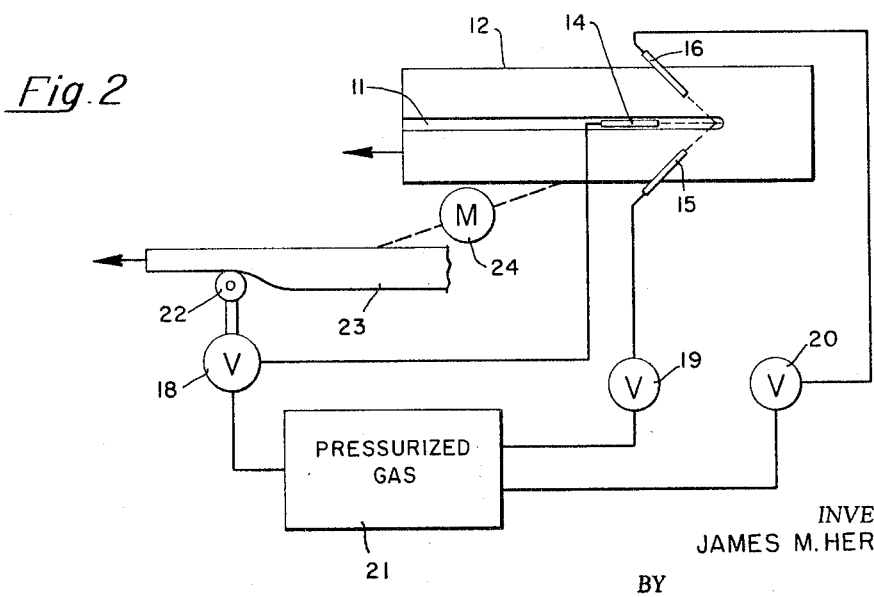

Other objects and advantages of the invention will be apparent from the following description taken in connection with the accompanying drawing wherein:

FIG. 1 is a perspective view of a plasma torch and jet arrangement embodying the invention; and FIG. 2 is a schematic view of a control system for the auxiliary jet arrangement shown in FIG. 1, the plasma torch not being shown for simplicity of illustration.

Referring now to the drawing, there is illustrated in FIG. 1 a plasma torch 10 cutting a groove 11 in a workpiece 12. The plasma torch 10 is of any conventional type which produces a high temperature plasma jet 13, and its details form no part of the present invention so that further elaboration thereof is felt unnecessary. Workpiece 12 is moved past torch 10 and the torch is inclined whereby jet 13 issues forwardly and downwardly from the torch relative to the workpiece, the jet lying in a vertical plane passing through the groove.

Mounted on plasma torch 10 by bracket means 17 are three auxiliary, tubular nozzles or jets 14, 15 and 16 which are connected through suitable tubing and through control valves 18, 19 and 20 to a reservoir 21 of pressurized gas, such as air. Valves 18–20 control the rate of flow of the gas through the jets 14–16. Valve 18 is actuated by a template follower 22 engaged with a template 23 that is driven by a motor 24 in synchronism wth movement of the workpiece past the plasma torch. Motor 24 is also operatively connected to drive the workpiece.

Jets 15 and 16 are bilaterally symmetrical relative to the groove being cut. Their axes are at the same angles relative to the longitudinal center line of the groove. Jets 15 and 16 direct streams 25 and 26 downwardly and forwardly across the top of the workpiece and across the sides of that portion of the groove being cut upon which molten metal would, in the absence of jets 15 and 16, build up to form a ridge. Streams 15 and 16 converge so that the molten metal which flows over the sides of the groove is picked up and is directed forwardly of the groove and into the longitudinal flow path caused by plasma jet 13 and the stream 27 of gas issuing from jet 14.

Jet 14 overlies groove 11 and directs stream 27 longitudinally forward and downward relative to the workpiece whereby stream 27 hits the plasma jet 13 before the plasma jet hits the workpiece. Stream 27 lies substantially in the same vertical plane containing jet 13 and groove 11 and is inclined at an angle less than the angle of inclination of plasma jet 13 whereby stream 27 hits the underside of the plasma jet.

When stream 27 hits plasma jet 13, both are deflected an amount proportional to their relative velocities. For a given setting of plasma jet 13, variation in the mass flow velocity of stream 27 varies the amount of the deflection and this phenomena is used to control the depth of groove 11. That is, the depth of cut is proportional to the deflection of the plasma jet. By varying stream 27, the depth of cut can be varied from a maximum depth when stream 27 is cut off or is negligible to no cut at all where stream 27 deflects jet 13 an amount so great that none of the workpiece is melted. When stream 27 is at maximum velocity and prevents plasma jet 13 from melting any of the workpiece it is believed to act as an insulating stream lying between the plasma jet and the workpiece. The forward longitudinal components of flow of the combined streams 27 and jet 13 blow molten metal forwardly from the groove.

Jet 14 can be operated without having to operate jets 15 and 16 where the sole object is to control the depth of the groove. Likewise, jets 15 and 16 can be operated without operating jet 14 where the object is to prevent buildup of ridges along the groove. On the other hand, all of jets 14–16 can be operated simultaneously so that their combined effect or operation is more effective to blow the molten metal forwardly and out of the groove.

In operation, when it is desired to cut a groove in a workpiece, the plasma tourch is first turned on to produce a plasma jet 13 that will, by itself, cut a groove of at least the maximum depth. It will be appreciated that this could be adjusted to cut a greater depth than that desired whereby it is necessary to limit the maximum depth through the operation of jet 14. Next, assuming it is desirable to operate all of jets 14–16 simultaneously, valves 19 and 20 are opened or actuated to produce streams 25 and 26 of equal velocities and volumes, the flow rates being sufficient to remove all the molten metal which flows over the sides of the groove regardless of the depth of groove whereby it is unnecessary during operation, to further vary the setting of valves 19 and 20.

Since the actuation of valve 18 is controlled by template 23, when the apparatus is placed in operation, stream 27 will not emerge from jet 14, depending upon the setting of plasma torch 10 and the initially-desired depth of the groove. Upon operation of motor 20, workpiece 12 and template 23 are moved in synchronism so that the workpiece moves past the plasma torch and groove 11 is cut in accordance with the pre-programmed configuration of template 23.

While only a single embodiment has been illustrated, it will be apparent to those skilled in the art that changes can be made in the details of construction and arrangement of parts without departing from the scope of the invention as defined in the appended claims.

What is claimed is:

1. For use in machining a groove in a workpiece, the combination of: a plasma torch operative to produce a plasma jet having a main axis directed towards and forwardly of the workpiece so as to melt portions thereof and carry at least some of the resultant molten metal away to form a groove; means including a jet nozzle arranged to direct a stream of gas longitudinally of the groove and against said plasma jet for altering the melting effect thereof while aiding said plasma jet in carrying molten metal from said groove; and means for varying the rate of flow of said stream of gas to deflect said plasma jet from said main axis proportionally to said rate of flow of said stream of gas to deflect said plasma jet proportionally to said rate of flow of said stream of gas.

2. In combination with the combination of claim 1, means for preventing the formation of a ridge along said groove, said means comprising an auxiliary jet operative to direct a stream of gas across the top of said workpiece at the area where molten metal flows out of the side of said groove, whereby such molten metal is carried into the longitudinal path of flow of metal from the groove caused by the said plasma jet and said first mentioned stream.

3. For use in machining a groove in a metal workpiece, the combination of: a plasma torch operative to produce a plasma jet directed downwardly and forwardly of the workpiece so as to melt portions thereof in carrying the resultant molten metal away to form a groove; means for moving the workpiece past said plasma torch; means including a first jet arranged to direct a stream of gas longitudinally of the groove and against the under side of said plasma jet for altering the melting effect thereof upon said workpiece and thereby varying the depth of the groove being formed; and means including second and third jets disposed at equal angles relative to the groove being formed and operative to direct streams of gas across the top of said workpiece at the areas where molten metal flows out at the sides of said groove whereby such molten metal is carried into the longitudinal path of flow of molten metal from said groove.

4. The combination of claim 3 wherein said first mentioned means comprises pre-programmed means for varying the flow through said first jet in a predetermined fashion.

5. The combination of claim 4 wherein said pre-programmed means includes a control valve, and a template moved in synchronization with movement of said workpiece and operatively connected for actuating said valve.

References Cited

UNITED STATES PATENTS

| | | | |
|---|---|---|---|
| 1,638,336 | 8/1927 | Himes | 219—121 |
| 2,587,331 | 2/1952 | Jordan. | |
| 2,941,063 | 6/1960 | Ducati et al. | 219—75 |
| 3,204,075 | 8/1965 | Browning | 219—75 |

JOSEPH V. TRUHE, *Primary Examiner.*